Aug. 10, 1965     D. L. COLEMAN ETAL     3,200,402
SELF-CONTAINED DATA RECORDER
Filed Dec. 14, 1960                      3 Sheets-Sheet 1

INVENTORS
DOVIE L. COLEMAN
WILLY A. FIEDLER
BY
George J. Rubens
ATTORNEY

Aug. 10, 1965    D. L. COLEMAN ETAL    3,200,402
SELF-CONTAINED DATA RECORDER
Filed Dec. 14, 1960    3 Sheets-Sheet 2

INVENTORS
DOVIE L. COLEMAN
WILLY A. FIEDLER
BY
George J. Rubens
ATTORNEY

INVENTORS
DOVIE L. COLEMAN
WILLY A. FIEDLER

BY

ATTORNEY

3,200,402
Patented Aug. 10, 1965

3,200,402
SELF-CONTAINED DATA RECORDER
Dovie L. Coleman, Ventura, and Willy A. Fiedler, Los Altos, Calif., assignors to the United States of America as represented by the Secretary of the Navy
Filed Dec. 14, 1960, Ser. No. 75,892
2 Claims. (Cl. 346—38)
(Granted under Title 35, U.S. Code (1952), sec. 266)

The invention described herein may be manufactured and used by or for the Government of the United States of America for governmental purposes without the payment of any royalties thereon or therefor.

This invention relates to data recorders, and, more particularly to a recorder that is self-contained and capable of being mounted to the exterior of a nonretrievable missile for separation and recovery.

During the test and evaluation of guided missiles it is imperative that certain performance data concerning the missile and its components be obtained and recorded, particularly for the launch phase. For example, it is necessary to obtain data regarding missile acceleration, booster motor operation including various fluid pressures, as well as providing a time base for reducing the data.

Heretofore such launch data was obtained by remote methods which included telemetry, optical and trailing wire systems. While these systems have proven for the most part to be adequate, they are quite expensive, relatively unreliable, and complex in construction requiring substantial modification of the vehicle to be evaluated.

The instant invention provides a recorder which is self-contained, as distinguished from prior art recorder systems depending on remote control and requiring a transmission system. For use in nonretrievable vehicles, the novel recorder is enclosed in a watertight case and releasably secured to the missile exterior to permit recovery and re-use. Within the case are disposed a movable recording medium and a battery-operated motor for driving the recording medium. Various transducers are mounted in the recorder for transmitting the data to the recording medium.

A primary object of this invention is to provide a self-contained data recorder capable of being used on moving vehicles.

Another important object is to provide a small, compact recorder that can be releasably secured to the exterior of a missile.

A still further object is to provide a recorder package which is ejectable from the exterior of a vehicle upon a predetermined event, and slowly parachuted to the surface and floatable until recovery.

Other objects and many of the attendant advantages of this invention will be readily appreciated as the same become better understood by reference to the following detailed description when considered in connection with the accompanying drawings wherein.

Figure 1:
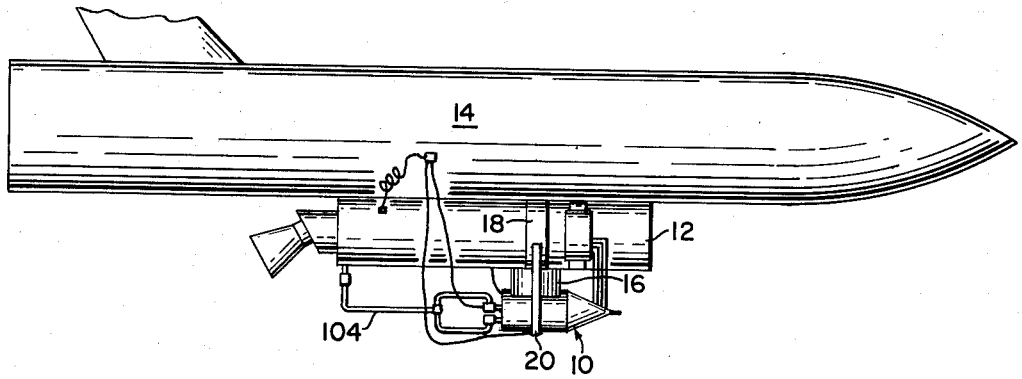
FIG. 1 is a side elevation view of the novel recorder shown mounted to a booster motor of a missile representing a typical installation.
Figure 2:
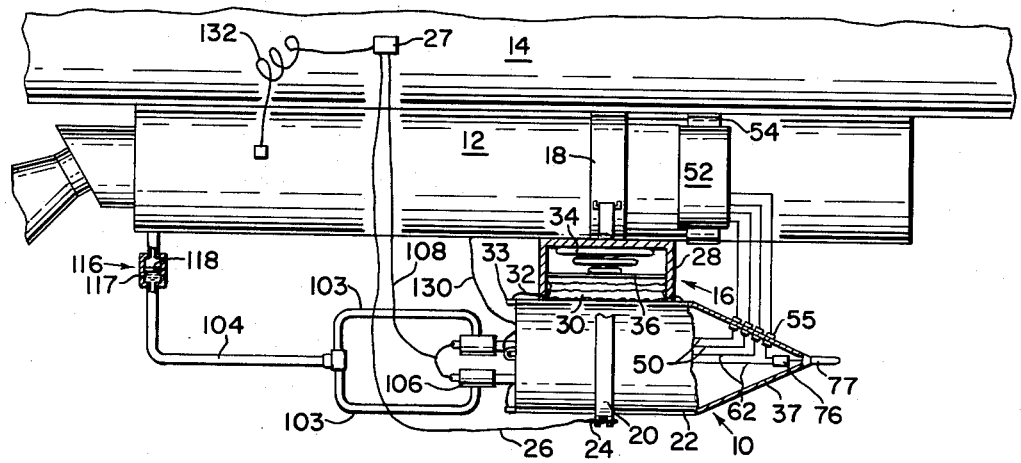
FIG. 2 is an enlarged diagrammatic elevation view of the recorder showing the hydraulic and electrical connections.

Referring to the drawing where the same reference numerals refer to like parts throughout the drawing, there is shown in FIGS. 1 and 2 a novel self-contained data recorder 10 shown attached to a booster motor 12 of a guided missile 14 through a parachute package 16. In the illustrated embodiment booster motor 12 is not intended to be retrieved, and for such use recorder 10 is mounted on the exterior of the booster rocket for subsequent recovery after the boost phase. In instances where the vehicle is to be recovered, the self-contained recorder 10 can be supported within the vehicle, if desired.

For external support as in FIG. 1, recorder 10 is attached to booster motor 12 by an encircling band 18 to which is anchored a pair of releasable straps 20 encircling recorder case 22 and parachute package 16. The free ends of the straps are releasably connected together by a slidable pin 24 tied to a lanyard 26 that is anchored to the missile at disconnect 27. Parachute package 16 comprises a cylindrical housing 28 having an open end adjacent recorder 10 and which contains a parachute 30 having shrouds 32 secured to spaced lugs 33 welded on the rear exterior of recorder case 22. The other end of housing 28 contains a coil spring 34 and a freely slidable plate 36 separating the spring and the parachute. Spring 34 is normally compressed in the assembled position as shown in FIGS. 1 and 2 so as to eject the parachute and attached recorder when straps 20 are released. For dummy launching where there is no separation between booster motor and missile, withdrawal of pin 24 can be effected by a predetermined decrease in booster motor pressure, as later described with reference to FIG. 7.

Recorder case 22 is cylindrical in configuration having a removable conical nose portion 37, the parts being sealed by suitable O-rings to make it dustproof and buoyant for use over water masses. Within the case is supported a frame 38 comprising a pair of circular plates 40 secured by bolts 42 in spaced relation to support therebetween a plurality of recorder instruments, preferably disposed radially about the longitudinal axis of the recorder to provide a small, compact and sealable package.

A recording medium supply drum 44 is suitably journaled between plates 40 and is driven by a constant-speed motor 46 through a suitable gear box 48. One type of recording medium found satisfactory is a wax-covered, pressure-sensitive tape 49, the tape being two inches wide and eight feet in length. Motor 46 is rated 6 volt, 30 r.p.m. and drives the tape at a speed of three inches per second, the power being supplied through conductors 50 from a battery pack 52 containing seven 4½ volt batteries. Battery pack 52 is fastened by straps 54 to the exterior of the booster and is not normally recoverable, the conductors 50 as well as others presently to be described being connected to the recorder by a plurality of terminals 55 on nose portion 37. Chart motor 46 can be connected into the firing circuit so that the motor is started several seconds before firing to enable the tape to reach full speed. A take-up drum 56 is secured in frame 38 in spaced relation to supply drum 44 and is driven thereby through a belt-pulley drive 58.

Figure 3:
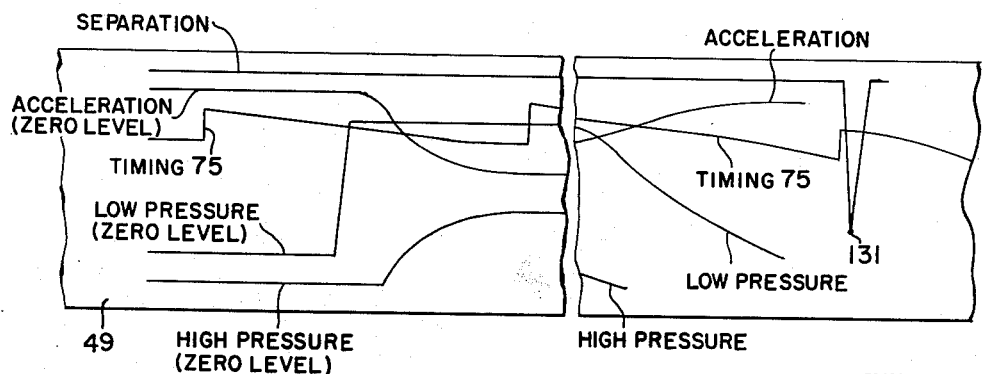
FIG. 3 is a partial top view of a sample recording medium showing the various recorded data.
Figure 4:
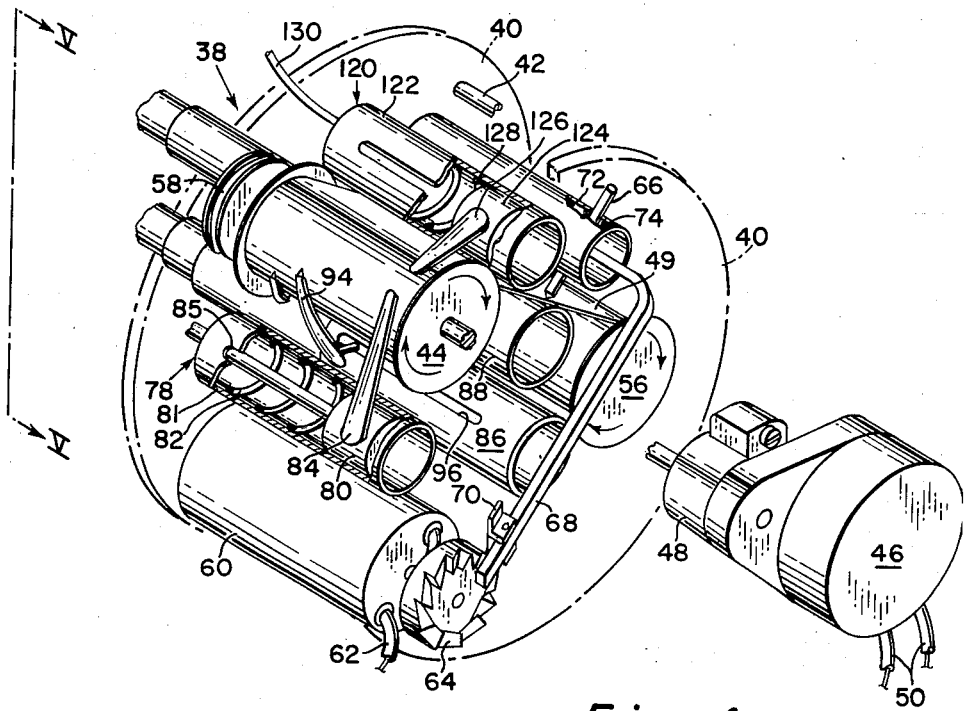
FIG. 4 is an isometric view of the recorder with the spaced mounting plates illustrated in phantom lines to show arrangement of the components supported therebetween.
Figure 5:
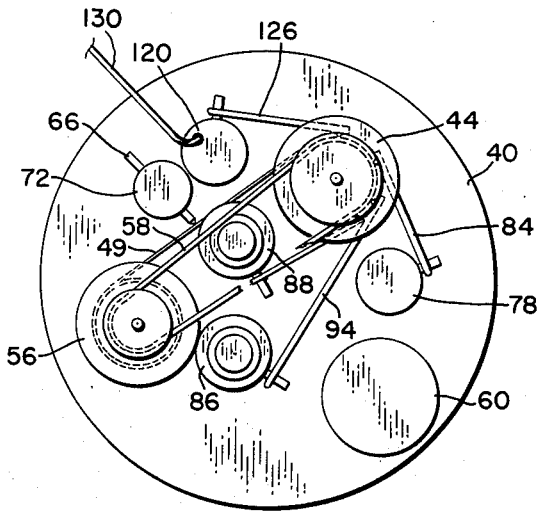
FIG. 5 is an end elevation of the recorder of FIG. 4 taken along line V—V.

To provide a time base to correlate the recorded data, the recorder has a timing mechanism which includes a timing motor 60 having leads 62 to battery pack 52. Motor 60 drives a ratchet-type timing cam 64 which actuates a timing stylus 66 through a pawl end of a rocker arm 68 pivoted to plate 40 at 70. Stylus 66 is transversely supported in a slotted cylindrical housing 72 secured between plates 40, the stylus being spring-biased by spring 74 to enable the arm 68 to follow the high and low points of the cam and marking recording medium 49 with the desired second indicia 75 as shown in FIG. 3. The timing range is obviously dependent on the length of the recording medium. For a tape travel of 3 in./sec., the timing range is 0–32 seconds with eight feet of tape. The timing motor is adjusted manually prior to each operation using a potentiometer 76 connected in the respective battery circuit. The potentiometer is located in the nose of the recorder case and is sealed in the case by a threaded cap 77. The motor is adjusted to coincide with a stop watch for a 15 second period.

Missile acceleration along a longitudinal axis is obtained by an accelerometer 78 which comprises a mass 80 slidably housed within a cylindrical case 81 supported between plates 40. Mass 80 is biased to a forward position by a precision coil spring 82, which spring is further compressed by the forward acceleration on mass 80. A stylus 84 is transversely secured on mass 80 and extends through and is guided in slot 85 in the case. The stylus bears against tape 49 to record the amplitude of the displacement of the mass, the acceleration being determined by the well-known formula $F=Ma$.

Figure 6:
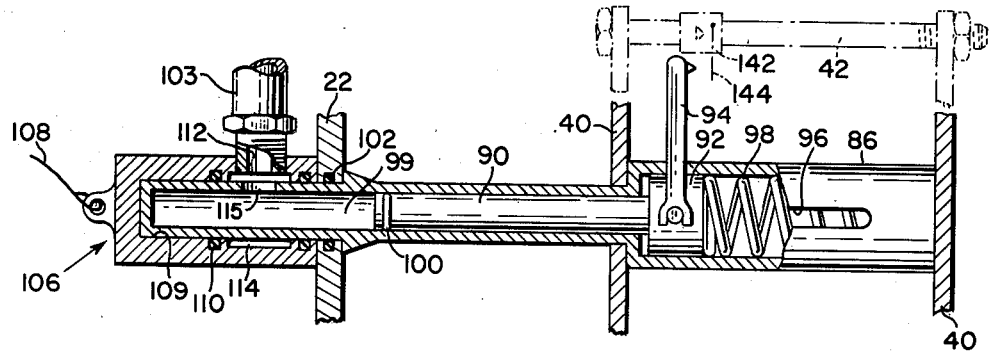
FIG. 6 is an enlarged cross-sectional view of a typical pressure pickup.

Operating pressure of the booster motor is recorded by means of one or more pressure transducers secured in recorder frame 38, two being illustrated, namely, a low pressure cylinder 86 (0 to 200 p.s.i.), and a high pressure cylinder 88 (200 to 2000 p.s.i.). The use of two pressure ranges is preferred to enable the sensitivity in the low pressure cylinder to be increased and thereby reduce the error. The details of a typical pressure cylinder, i.e. low pressure cylinder 86, is shown in FIG. 6 in which is mounted a piston 90 having an enlarged portion 92 on which is mounted a stylus 94 extending through a slot 96 in the cylinder wall to engage tape 49. A coil spring 98 is positional between enlarged portion 92 and the end of the cylinder to resist the movement of the fluid pressure acting on chamber 99. For high pressure cylinder 88, spring 98 is rigid for pressures under 200 p.s.i., as is indicated by the unaffected high pressure curve in FIG. 3. The only difference between the construction of the low and high pressure transducers is in the compressibility of the respective springs and the areas of the pistons. An O-ring 100 seals the piston in the chamber 99, and an O-ring 102 seals the opening in recorder case 22.

Cylinders 88 and 86 are hydraulically connected by pipes 103 to a common pressure line 104 (see FIG. 2) from the booster motor by means of connectors 106, each connector anchored to disconnect 27 on the missile for separation by a common lanyard 108. Each disconnect has a bore 109 slidably to receive cylinder 86, the bore being provided with a pair of O-rings 110 disposed on each side of inlet 112 of 103 and being undercut at 114 to permit the fluid flow through cylinder port 115 into chamber 99 and against piston 90. O-rings 110 function also to provide a snug, slidable fit between the disconnect and the cylinder enabling the former to be pulled off by lanyard 108 when the recorder is released from the booster motor. To avoid the hot booster motor gases damaging the pressure cylinder, an isolation relay 116 is inserted in pressure line 104 adjacent the motor, line 104 between the relay and the pressure cylinders being filled with a hydraulic liquid. Isolation relay is of conventional design including a cylinder 117 and a piston 118 wherein the booster motor gas pressure acting on one side of the piston is converted to hydraulic pressure in line 104 on the other side to operate the pressure transducers.

A transducer 120 records the time of separation of the booster motor from the missile and consists of a cylinder 122 supported between plates 40 and housing a piston 124 on which is fixed a stylus 126 adapted to engage the recording medium. A coil spring 128 biases the piston to one end of the cylinder, the piston being attached to the booster motor by a lanyard 130 which extends through plate 40 and case 22. Tension on lanyard 130 when booster motor separates moves piston 124 to compress the spring and the stylus marks the recording medium at the separation point 131 of FIG. 3. Release of disconnect 27 mounted on the missile, to which lanyards 26 and 108 are connected, is accomplished by a lanyard 132 secured to booster motor 12.

The ejection system of the aforedescribed recorder is actuated by booster motor separation from the missile. A system of lanyards 26, 108 and 132 of different predetermined lengths attached from the missile to the recorder performs the operations in the following timed sequence which is necessary for successful ejection of the recorder:

(1) Actuation of separation transducer 120 through lanyard 130;

(2) Pressure connectors 106 disconnect from the recorder through lanyard 108;

(3) Battery wires part at terminals;

(4) Recorder released from booster motor through lanyard 26; and lastly, (5) Connector 27 anchoring lanyards 26 and 108 to missile released by lanyard 132 when booster motor separates from missile.

Figure 7:
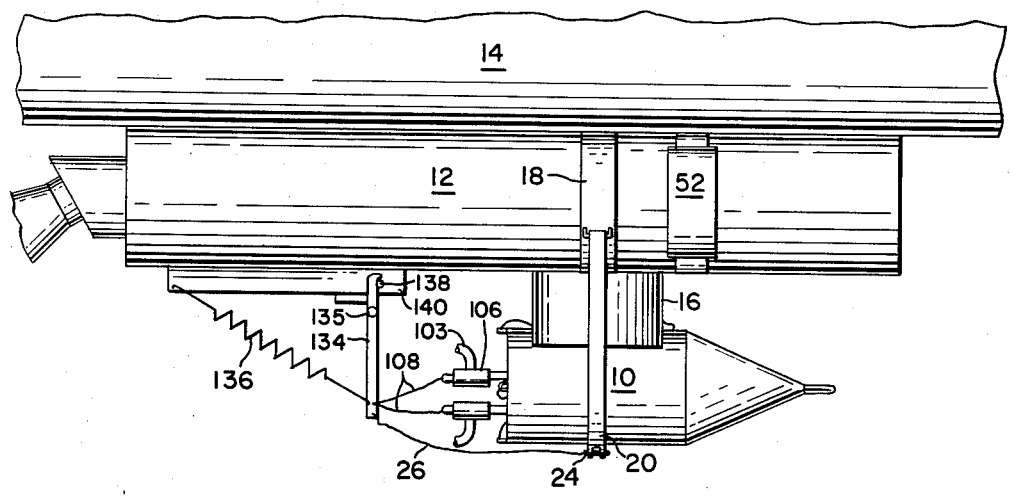
FIG. 7 is an elevation view of a modified recorder release mechanism actuated by fluid pressure.

When data recorder 10 is used on dummy launches wherein the booster motor does not separate, an ejection system has been devised which is actuated by a predetermined drop of booster pressure, as illustrated in FIG. 7. In this modification the recorder and parachute package are identical to recorder 10 and parachute package 16 previously described, the only difference being that lanyards 26 and 108, to pin 24 and connectors 106, respectively, are connected to and actuated by a mechanism including an arm 134 intermediately pivotally mounted at 135 to booster motor 12. The end of arm 134 connected to the lanyards is cocked by a tension spring 136 which biases the arm to an aft position, movement of arm 134 being restrained by a solenoid latch 138 of solenoid 140 which latch lies in the path of the arm to prevent rotation by spring 136. Withdrawal of latch 138 to release spring-loaded arm 134 is accomplished by energization of a microswitch 142 suitably mounted on a spacer bolt 42 of the recorder frame adjacent low pressure cylinder 86 (see FIG. 6). Microswitch 142 has an arm 144 which lies in the path of stylus 94 and is actuated thereby only on the return stroke of the stylus as booster motor pressure decreases. Microswitch 142 and solenoid 140 are connected in a circuit with a suitable power source so that upon closing of switch 142 the solenoid is energized to release arm 134 successively separating connectors 106 and pin 24, the latter permitting recorder 10 to be ejected. It should be again noted that microswitch 142 and the associated circuitry and solenoid mechanism are not needed in the embodiment of FIGS. 1 to 6 where physical separation of the booster motor accomplishes the disconnection of the recorder.

The present invention provides a rugged, compact tape recorder suitable for use in the test and evaluation of guided missiles and the like, which can record simultaneously the data from one or more transducers during flight conditions. It is obvious that the type of data and the transducers to be employed will depend on the particular test being conducted. The recorder may be detachably secured to the exterior of a booster motor or the like and released by physical separation of the booster motor from the vehicle, or by a drop in booster motor pressure. The recorder is provided with a parachute to ensure safe descent after release. The recorder case is sealed to be buoyant in event it is ditched over water. The data recorder is provided with its own battery pack to be a self-contained unit readily adapted to various vehicles to be tested.

Obviously many modifications and variations of the present invention are possible in the light of the above teachings. It is therefore to be understood that within the scope of the appended claims the invention may be practiced otherwise than as specifically described.

We claim:

1. A self-contained data recorder for use on a missile vehicle having a fluid motor, said recorder comprising an outer case, a parachute connected to said outer case, releasable means for detachably supporting the case to the missile exterior, said recorder case supporting therein a frame having a longitudinal axis, a recording medium, spool means for movably supporting the recording means on the frame, a D.C. motor for driving said spool means, a D.C. timing motor, a time recording means driven by said motor, a battery pack for supplying power for said motors, a plurality of transducers responsive to vehicle operational forces for which data is to be obtained, said transducers being radially disposed about said longitudinal axis and about said recording medium, each transducer having a mechanically actuated stylus means for engaging the recording medium, one of said transducers being responsive to a fluid motor pressure, conduit means connecting the transducer to the fluid motor, disconnectible means connecting said conduit to the transducer, lanyards connecting said recorder releasable means and said disconnectible means to the motor, whereby a tension on said lanyards will actuate the respective means in a predetermined sequence.

2. The recorder of claim 1 wherein said parachute is housed between said missile and said recorder and spring means are provided for ejecting said parachute and recorder away from said missile when the recorder is released.

References Cited by the Examiner

UNITED STATES PATENTS

| 847,198 | 3/07 | Naul | 102—34.1 |
| 2,461,322 | 2/49 | Hathaway | 346—138 X |
| 2,779,283 | 1/57 | Baughman | 102—49 |
| 2,801,571 | 8/57 | Lusser | 89—1.7 |

BENJAMIN A. BORCHELT, *Primary Examiner.*

SAMUEL FEINBERG, CHESTER L. JUSTUS,
*Examiners.*